United States Patent [19]

Mitumaru

[11] Patent Number: 4,933,790
[45] Date of Patent: Jun. 12, 1990

[54] FRONT DOOR MECHANISM FOR SIGNAL RECORDING-REPRODUCING APPARATUS FOR USE WITH CASSETTE

[75] Inventor: Hiroshi Mitumaru, Daito, Japan

[73] Assignee: Sanyo Electric Co., Ltd., Osaka, Japan

[21] Appl. No.: 245,180

[22] Filed: Sep. 16, 1988

[30] Foreign Application Priority Data

Sep. 17, 1987 [JP] Japan ................ 62-233178
Oct. 15, 1987 [JP] Japan ................ 62-260260
Oct. 15, 1987 [JP] Japan ................ 62-260261

[51] Int. Cl.⁵ .................................... C11B 15/00
[52] U.S. Cl. ........................................... 360/96.5
[58] Field of Search ............. 360/96.5, 96.6, 93, 360/90, 99.02, 99.03, 99.06, 99.07; 242/198–201

[56] References Cited

U.S. PATENT DOCUMENTS

| 4,533,966 | 8/1985 | Kume ................ 360/93 |
| 4,607,301 | 8/1986 | Iizuka .............. 360/96.5 |
| 4,795,109 | 1/1989 | Chung et al. ...... 360/96.5 |

FOREIGN PATENT DOCUMENTS

| 0143598 | 6/1985 | European Pat. Off. . |
| 0227107A2 | 7/1987 | European Pat. Off. . |
| 3644284A1 | 6/1987 | Fed. Rep. of Germany . |
| 61-98255 | 6/1986 | Japan . |
| 61-211865 | 9/1986 | Japan . |
| 61-276159 | 12/1986 | Japan . |

Primary Examiner—David J. Severin
Attorney, Agent, or Firm—Armstrong, Nikaido, Marmelstein, Kubovcik & Murray

[57] ABSTRACT

A front door mechanism for a signal recording-reproducing apparatus comprising a front door disposed at a cassette inlet and openable outwardly of the apparatus, a first spring biasing the front door in its closing direction, a drive lever assembly movable in operative relation with a cassette loading mechanism, an auxiliary lever provided between the drive lever assembly and the door, and a second spring for biasing the auxiliary lever in a direction to open the door. The front door is automatically opened or closed with the movement of the loading mechanism. When the front door is manually closed with the supply of current to the apparatus interrupted, the auxiliary lever rotates with the lever assembly held at a stop. The rotation of the auxiliary lever is absorbed by the elastic deformation of the second spring.

6 Claims, 7 Drawing Sheets

FRONT DOOR MECHANISM FOR SIGNAL RECORDING-REPRODUCING APPARATUS FOR USE WITH CASSETTE

FIELD OF THE INVENTION

The present invention relates to a mechanism for opening and closing a front door disposed at a cassette inlet in the front side of an apparatus for recording signals on a magentic tape in a cassette or reproducing signals from the magnetic tape, and more particularly to a mechanism for opening the front door outwardly of the apparatus when the cassette is inserted into and removed from the apparatus.

BACKGROUND OF THE INVENTION

Conventional cassette-type signal recording-reproducing apparatus such as video tape recorders (VTRs) have a cassette loading mechanism for transporting the cassette inserted into a cassette inlet in the front side of the apparatus to a recording-reproducing position, and are provided at the inlet with a front door which is opened toward the inside of the apparatus. The door is opened and closed in operative relation with the cassette loading mechanism as disclosed, for example, in Unexamined Japanese Patent Publication No. SHO 61-211865 and Unexamined Japanese Utility Model Publication No. SHO 61-98255. None of the conventional apparatus are so adapted that the front door at the inelt is openable outwardly of the apparatus.

The front door for opening and closing the cassette inlet is also usable for guiding the cassette with its front side when it is loaded and unloaded, after the front door is turned into the apparatus through 90 degrees to a fallen position with the front side up.

However, the conventional apparatus wherein the door is opened inwardly thereof has the problem that the cassette which moves in sliding contact with the front surface of the door defaces the surface, permitting the defacement to show up when the door is closed.

Further to provide compacted apparatus of diverse designs, it has been attempted to provide operation switches on the front side of the door and to dispose an electric circuit connected to the switches within the thickness of the door, thereby making the door usable as an operation panel.

When the door is openable inward, nevertheless, there arises the objection that the cassette is moved over the operation switches, so that the above arrangement is infeasible.

These problems can be overcome if the front door is made openable outwardly of the apparatus, but when the conventional door opening-closing mechanism is then employed as the basic structure, the following problem will be encountered.

When the supply of power to the apparatus is interrupted with the door open, for example, owing to a power failure or to the slipping-off of the plug from the receptacle, it may be attempted to forcibly close the door with hand. The movement of the door will then be delivered to the door opening-closing mechanism and the cassette loading mechanism, causing trouble or damage to these mechanisms.

An apparatus having a different cassette loading mechanism has been proposed (Unexamined Japanese Patent Publication No. SHO 61-276159). When the cassette is to be loaded, a cassette holder within the apparatus is extended outward from a front opening of the apparatus. The mechanism starts loading the cassette as placed on the extended holder.

With this apparatus, there is no need to insert the cassette into the apparatus, but the cassette holder must be extended by a distance corresponding to the size of the cassette. To reliably support the extended holder in a cantilever fashion, there arises a need to provide great support means, which invariably makes the holder large in size.

SUMMARY OF THE INVENTION

An object of the present invention is to provide a front door mechanism for use in an apparatus of the type described wherein the front door is openable outwardly of the apparatus in operative relation with a cassette loading mechanism and is smoothly closable manually when the power supply to the apparatus is interrupted.

Another object of the invention is to provide a front door mechanism of the type mentioned above which is adapted to lock the door in its closed position and to automatically unlock the door with the loading movement of the cassette loading mechanism.

Another object of the invention is to provide a front door mechanism of the type mentioned above wherein when the front door is opened outwardly of the apparatus and maintained in an approximately horizontal position, the upper side of the door is usable as a guide surface for inserting the cassette into the apparatus, the cassette thus being made easily insertable into the apparatus without the necessity of extending a cassette holder from the cassette inlet.

Still another object of the invention is to provide a front door mechanism which is adapted to automatically close the front door except when loading or unloading the cassette so as to render the interior of the apparatus free from dust or extraneous matter to the greatest possible extent.

The front door mechanism of the present invention comprises a front door disposed at a cassette inlet of a cassette-type signal recording-reproducing apparatus and openable outwardly of the apparatus, first spring mean for biasing the front door in its closing direction, a drive lever assembly movable in operative relation with a cassette loading mechanism, an auxiliary lever provided between the drive lever assembly and the door, and second spring means for biasing the auxiliary lever in a direction to open the door.

When the drive lever assembly is in an operative state waiting for the insertion of a cassette, the auxiliary lever is rotatable from a door opening first rotational angle to a door closing second rotational angle.

The biasing force of the second spring means in the door opening direction is greater than the biasing force of the first spring means in the dooor closing direction.

Lock means can be incorporated in the door mechanism for locking the front door in its closed position. The lock means is provided with an engaging portion with which when the drive lever assembly is in the operative position waiting for the insertion of the cassette, the door is engageable by closing the door and from which the door is disengageable by the loading movement of the cassette loading mechanism.

While current is passed throught the signal recording-reproducing apparatus, the drive lever assembly and the auxiliary lever operate with the loading movement and unloading movement of the cassette loading mechanism to thereby automatically open and close the front door.

While no current is supplied to the apparatus, the auxiliary lever rotates when the front door is manually closed, but the drive lever assembly remains at a stop, so that the rotation of the auxiliary lever is absorbed by the elastic deformation of the second spring means.

Consequently, the drive lever assembly or the cassette loading mechanism is not subjected to any objectionable force.

When current is supplied to the apparatus with the door manually closed and held in its locked position, the drive lever mechanism moves in the cassette loading direction to release the door from the lock means. The subsequent unloading movement therefore opens the door for the insertion of a cassette.

The door mechanism of the present invention opens the front door outward, so that the inner surface of the door is usable for guiding the insertion of the cassette. Moreover, even if the inner surface is defaced, the defacement is held out of sight when the door is closed.

Since there is no likelihood of the cassette contacting the front surface of the front door, operation switches can be arranged on the door front surface to use the door as an operation panel. This serves to make the apparatus more compact.

DESCRIPTION OF THE PREFERRED EMBODIMENT

A VTR embodying the invention will be described below in detail with reference to the drawings.

Throughout FIGS. 1 to 4, the hatching on a first lever 2 does not represent a section but indicates the shape of a cam 23 formed on the rear side of the lever as will be described later. A second lever 3 is hatched to show the apparent shape of the second lever.

Construction of Front Door

Figure 1:
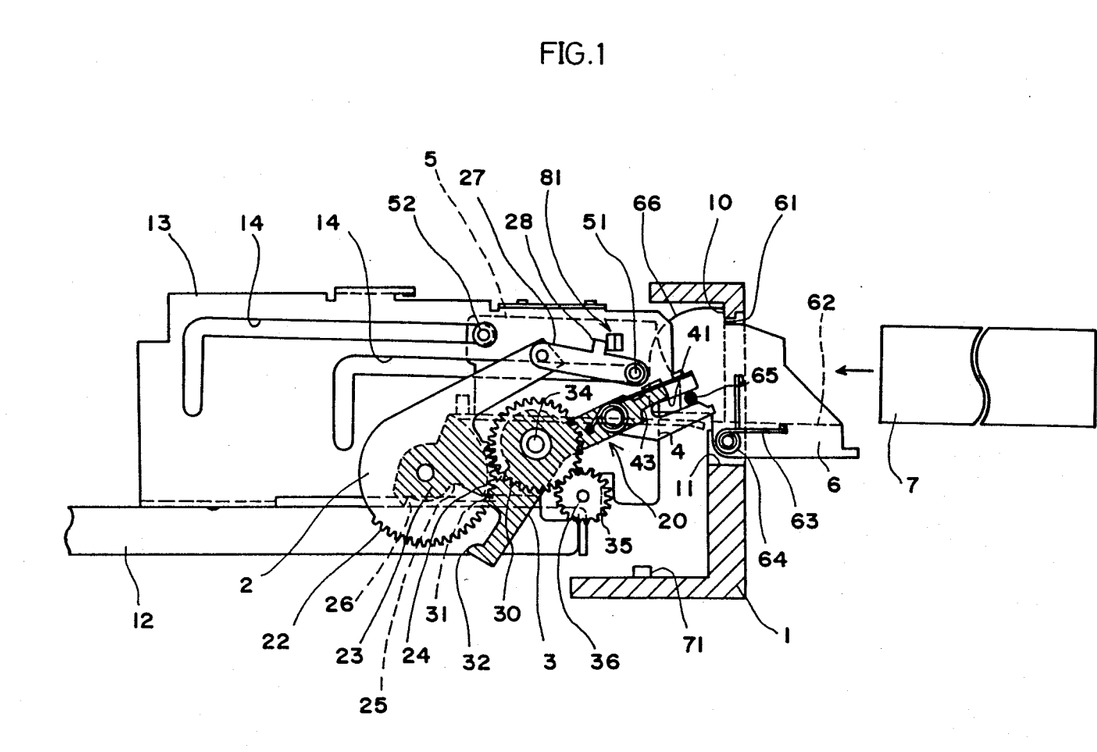
FIG. 1 is a side elevation showing a door mechanism with a front door in an opened position.

As seen in FIG. 1, a front panel 1 is formed with a cassette inlet 11 in its upper portion. A front door 6 is pivoted at its lower portion to the front panel 1 so as to be rotatable forwardly downward about the lower side of the inlet 11 and is biased toward its closing direction by a first spring 63.

Figure 7:
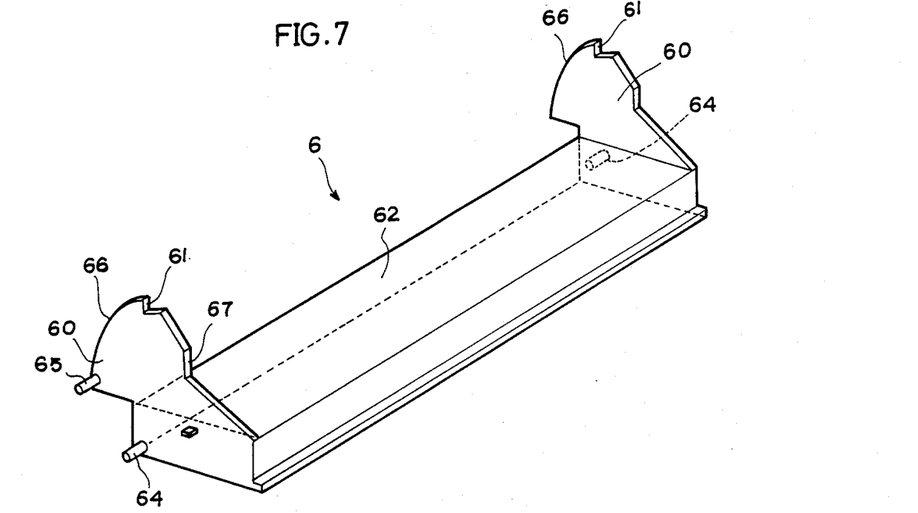
FIG. 7 is a perspective view of the front door.

With reference to FIG. 7, the front door 6 is provided at each end thereof with an end plate 60 having a contact face 61 adapted to bear against the inlet-defining upper edge 10 of the front panel 1 for limiting the opening angle of the door 6 to 90 degrees, and with a circular-arc pressing portion 66 for pushing a cassette holder 5 inward as will be described later.

Each end plate 60 further has a pivot 64 projecting therefrom and supported by the front panel 1. One of the end plates 60 has an opening-closing drive pin 65 projecting therefrom and in engagement with the auxiliary lever 4 to be described later.

Cassette Loading Mechanism

Figure 5:
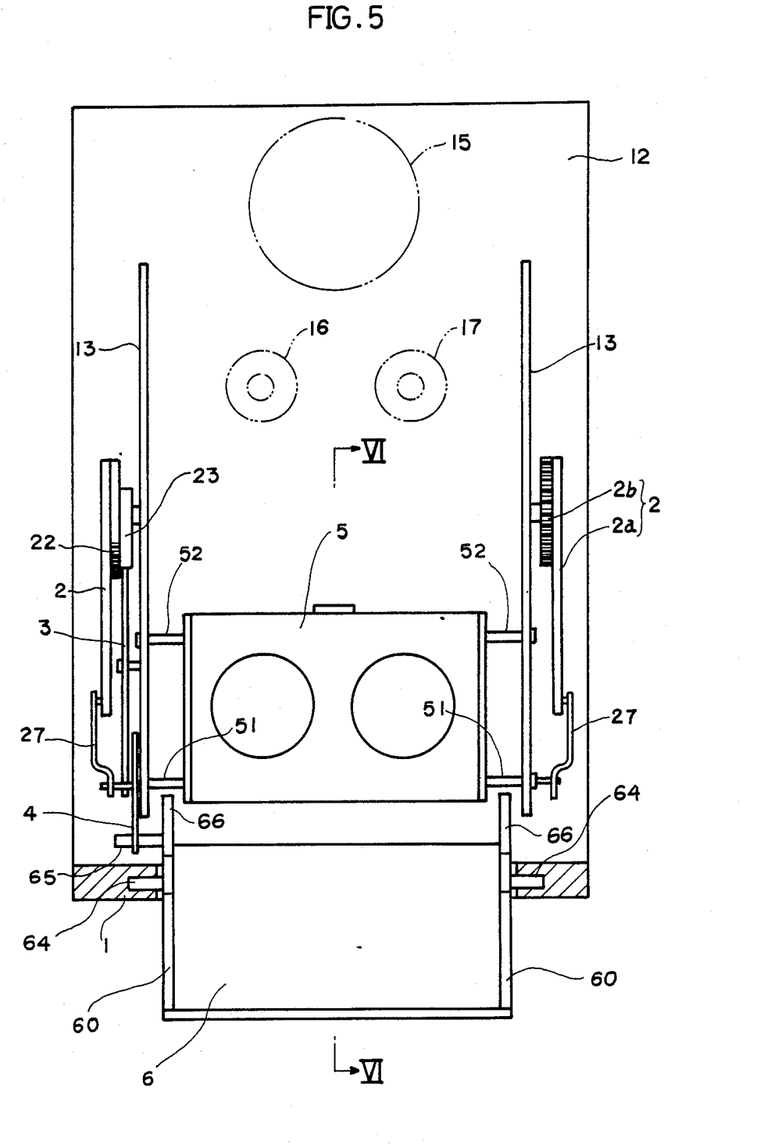
FIG. 5 is a plan view partly broken away and showing the door mechanism when the door is left open.

As is already known, a cassette loading mechanism is disposed inwardly of the front panel 1. FIGS. 1 and 5 show the mechanism. A chassis 12 carrying a rotary head cylinder device 15 and a pair of reel supports 16, 17 is provided at its opposite sides with a pair of projecting side plates 13, 13, with the cassette holder 5 disposed therebetween. Each side plate 13 is formed with two generally L-shaped guide grooves 14, 14. The holder 5 has short pins 51, 52 projecting from its opposite sides and slidably fitted in the guide grooves 14 of the opposing side plates 13.

Accordingly, the cassette holder 5 is retractable approximately horizontally along the guide grooves 14 and turnable downward at the bent portions of the grooves to further move downward.

Figure 6:
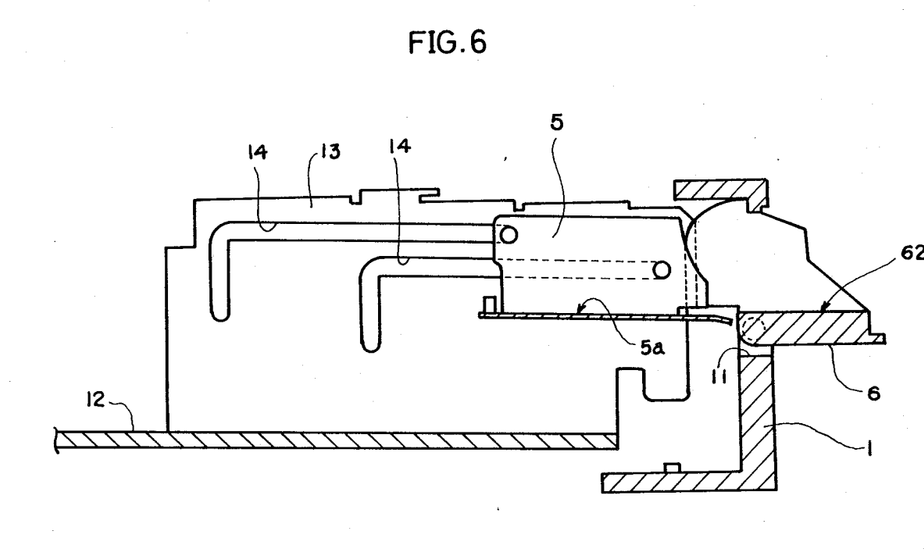
FIG. 6 is a view in section taken along the line VI—VI in FIG. 5.

The cassette holder 5 has a bottom plate 5a, which is flush with the inner surface 62 of the front door 6 in its opened position when the holder 5 is at one end of its movement toward the door as seen in FIG. 6.

A first lever 2 is pivoted to each side plate 13 approximately centrally thereof. The left first lever 2 shown in FIG. 5 has a base end portion formed with a sector gear 22 centered about the center of rotation of the lever and subtending a predetermined angle at the center as seen in FIG. 1. The gear 22 is coupled to a drive gear 35 by an intermediate gear 30.

Concurrently, the right first lever 2 shown in FIG. 5 comprises a lever portion 2a and a gear portion 2b separate therefrom. A torsion spring (not shown) is provided between the lever portion 2a and the gear portion 2b. An unillustrated loading motor is coupled to the gear portion 2b via an unillustrated transmission means. The loading motor is controllable so as to stop automatically when overloaded as will be described later.

The drive gear 35 is provided on each of the side plates 13, and the two gears 35 are interconnected by an unillustrated shaft to rotate together.

The front end of the first lever 2 is pivotably connected to the short pin 51 closer to the front door 6 of the holder 5 by a link plate 27.

A sensor 71 for detecting the presence or absence of a cassette 7 on the holder 5 is disposed inside the front panel 1. A loading start switch 81 is mounted on one of the side plates 13. The sensor 71 comprises, for example, a photocoupler. The loading start switch 81 is actuated by a lug 28 on the link plate 27.

Figure 2:
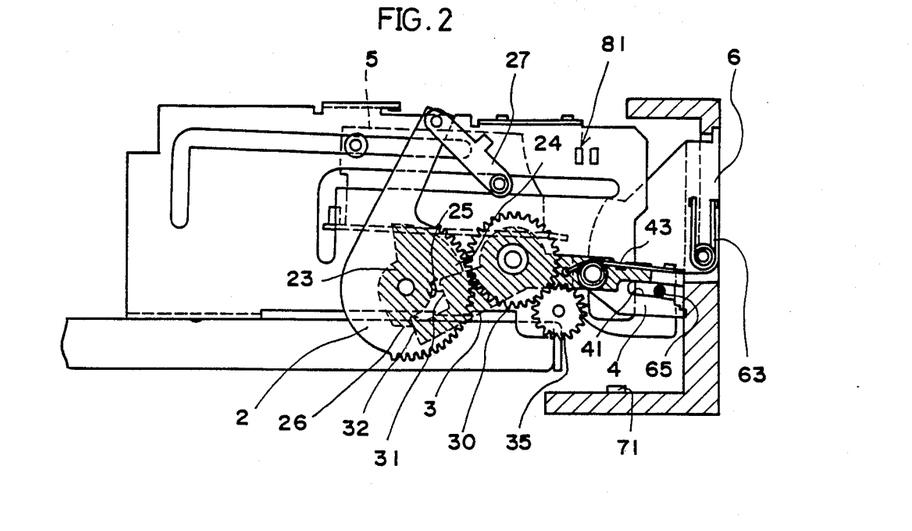
FIG. 2 is a side elevation showing the door mechanism with the front door closed.
Figure 3:
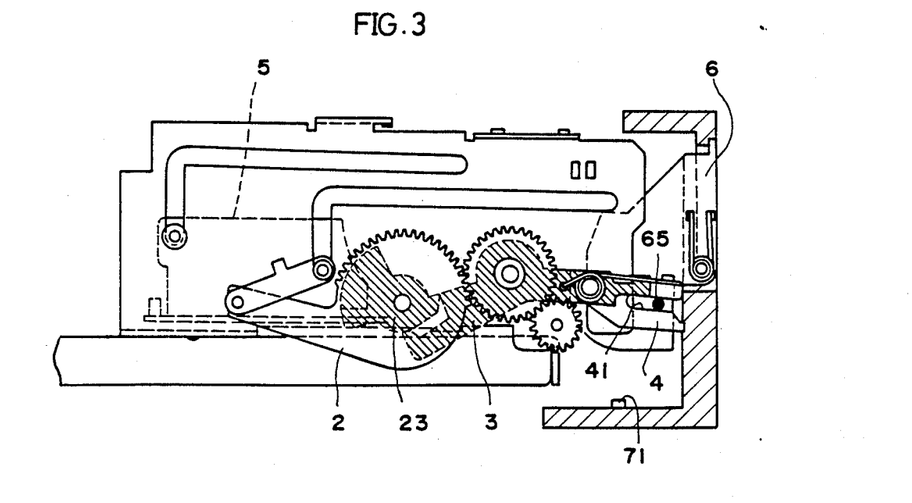
FIG. 3 is a side elevation showing the door mechanism with a cassette in its completely loaded position.

When the tape cassette 7 as placed in the holder 5 is pushed inwardly of the apparatus in the state of FIG. 1, the torsion spring between the lever portion 2a and the gear portion 2b elastically deforms, and the holder 5 slightly retracts. This moves the link plate 27, opening the loading start switch 81 and initiating the loading motor into operation, whereby the first levers 2 are driven counterclockwise to move the holder 5 horizontally and vertically as shown in FIGS. 2 and 3 and transport the cassette 7 to the recording-reproducing position shown in FIG. 3.

Door Opening-Closing Assembly

In the vicinity of the first lever 2, each side plate 13 is provided with a second lever 3 which constitutes a drive lever assembly 20 along with the first lever 2. The second lever 3 is freely rotatably mounted on the shaft 34 of the intermediate gear 30 shown in FIG. 1, independently of the rotation of the gear 30. The second lever 3 has on end close to the door and carrying an auxiliary lever 4 pivoted thereto. The lever 4 is pivotally movable along the plane of pivotal movement of the second lever 3.

Figure 8:
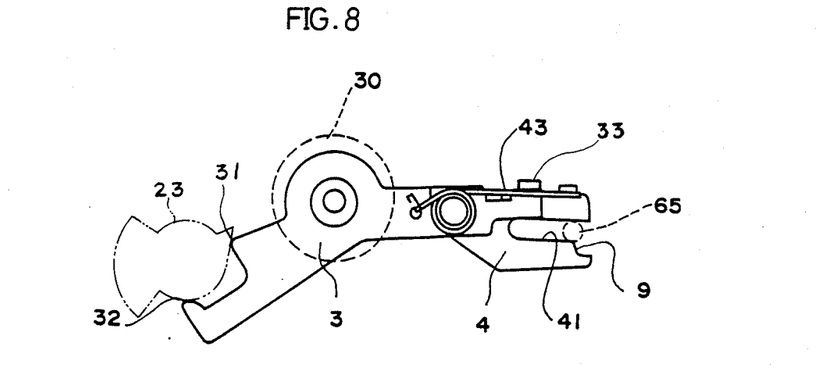
FIG. 8 is a side elevation showing a second lever and an auxiliary lever as attached thereto.

With reference to FIG. 8, the auxiliary lever 4 is always biased counterclockwise by a second spring 43 provided between the lever 4 and the second lever 3. The counterclockwise movement of the lever 4 is restricted by a stopper 33 on the second lever 3.

The second spring 43 is designed to bias the front door 6 in its opening direction with a force greater than the force of the first spring 63 which biases the door in the closing direction.

With reference to FIGS. 1 to 3, the auxiliary lever 4 is formed with a guide groove 41 having slidably fitted therein the opening-closing drive pin 65 on the front door 6. The front end of the guide groove 41 is left open, and the open end of the lever 4 has a lock portion 9 engageable with the drive pin 65 on the front door 6 in its closed position.

When the auxiliary lever 4 and the second lever 3 rotate together clockwise from the state of FIG. 1, a downward force acts on the drive pin 65, closing the front door 6 as shown in FIG. 2.

With reference to FIG. 8, the other end of the second lever 3 has a first contact portion 31 and a second contact portion 32 which are engageable with a cam 23 provided on the first lever 2.

The cam 23 has a protuberant face 24 for pressing the first contact portion 31, a recessed portion 25 for releasing the first contact portion 31, and an engaging portion 26 for engaging the second contact portion 32 to restrain the first lever 2 from counterclockwise rotation.

When the first contact portion 31 of the second lever 3 is in contact with the pressing protuberant face 24 of the cam 23, the second lever 3 is prevented from clockwise rotation. Consequently, the auxiliary lever 4 on the second lever 3 holds the drive pin 65 of the front door 6 lifted against the first spring 63 biasing the door 6 in the closing direction, thereby holding the door 6 open.

When the first lever 2 rotates counterclockwise, moving the pressing protuberant face 24 out of engagement with the first contact portion 31 of the second lever 3, the auxiliary lever 4 in engagement with the drive pin 65 on the door 6 and the second lever 3 rotate clockwise, permitting the first spring 63 to close the front door 6. Consequently, the first contact portion 31 of the second lever 3 opposes the release recessed portion 25 of the cam 23, and the second contact portion 32 of the second lever 3 comes into engagement with the engaging portion 26 of the cam 23.

Mode Control Circuit

Figure 9:
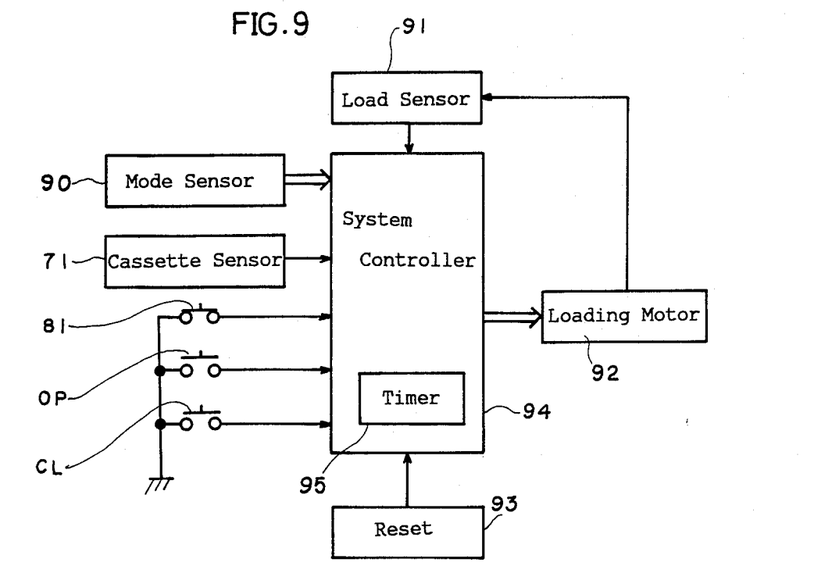
FIG. 9 is a block diagram of a mode control circuit.

With reference to FIG. 9, a system controller 94 comprising a microcomputer has input ports having connected thereto an open switch OP and close switch CL for giving an instruction to open or close the door 6, the loading start switch 81, mode sensor means 90 for detecting the operation mode of the apparatus based on the angle of rotation of the first lever 2 detected, the cassette detecting sensor 71, reset means 93, load sensor means 91 for detecting the load on the loading motor, etc. The system controller 94 has an output port connected to the loading motor 92.

The system controller 94 has incorporated therein timer means 95 for measuring the duration of the unloaded state of the apparatus with the door held open, based on outputs from the cassette sensor 71, loading start switch 81, etc. and also for detecting the time when the duration exceeds 20 seconds.

The open switch OP and the close switch CL are actuated in operative relation with the depression of an open button and close button arranged on the operation panel of the VTR.

The cassette is loaded into and unloaded from the VTR in the following manner when current is supplied thereto.

Loading Operation

When a loading instruction switch (not shown) on the operation panel is depressed while the cassette holder 5 is positioned for a waiting mode with the front door 6 closed as seen in FIG. 2, the loading motor is started up, causing the drive gears 35 and intermediate gears 30 to rotate the first levers 2 clockwise to push the holder 5 toward the front door 6 through the link plates 27.

The clockwise rotation of the first lever 2 presses the protuberant face 24 of the cam 23 on the lever 2 against the first contact portion 31 of the second lever 3 to rotate the second lever 3 counterclockwise as seen in FIG. 1.

The auxiliary lever 4 on the second lever 3 also rotates counterclockwise together with the second lever 3, lifting the opening-closing drive shaft 65 on the front door 6 to open the door 6 as shown in FIG. 1.

At this time, the lug 28 on the link plate 27 closes the start switch 81 to stop the loading motor.

Next, a cassette 7 is inserted slidingly along the inner surface 62 of the door 6 into the holder 5 waiting at the same level as the inner surface.

The sensor 71 detects the insertion of the cassette 7, whereupon the loading motor rotates in a direction opposite to the previous direction, rotating the first levers 2 counterclockwise and moving the holder 5 inwardly of the apparatus.

The counterclockwise rotation of the first lever 2 brings the protuberant face 24 of the cam 23 on the first lever 2 out of contact with the first contact portion 31 of the second lever 3, permitting the first spring 63 to act to close the front door 6, whereas the cassette 7 on the front door 6 prevents the closing of the door 6 until the cassette moves over the door.

As a result, the second lever 3 and the auxiliary lever 4 remain in the state of FIG. 1, with the first lever 2 only allowed to rotate.

When the cassette 7 has moved over the door 6 into the inlet 11, the door 6 closes under the action of the first spring 65, whereupon the second lever 3 rotates clockwise late than the first lever 2. At this time, the first lever 2 has been rotated to a position where the engaging portion 26 of the cam 23 is unlikely to engage the second contact portion 32 of the second lever 3. Thus, the first lever 2 is rotatable counterclockwise free of any trouble, moving the holder 5 toward the loading completed position shown in FIG. 3.

On completion of loading, the loading motor is automatically stopped by the operation of a loading completion detecting switch provided at a suitable location or an increased load on the loading motor at the completed position.

Unloading Operation

The loading motor is driven to rotate the first levers 2 clockwise from the loading completed state of FIG. 3, whereby the cassette holder 5 is moved toward the cassette inlet 11.

The cam 23 on the first lever 2 driven rotates the second lever 3 counterclockwise, also rotating the auxiliary lever 4 thereon counterclockwise. The lever 4 lifts the drive pin 65 on the front door 6 to half-open the door 6 against the first spring 63.

The auxiliary lever 4 driven opens the front door 6 because the second spring 43 biases the lever 4 counterclockwise relative to the second lever 3 with a force greater than the force of the first spring 63 biasing the door 6 in the closing direction, permitting the auxiliary lever 4 to rotate with the second lever 3 counterclockwise against the first spring 63.

After the door 6 is half-opened, the door 6 is forcibly opened by being pushed by the cassette 7 passing through the cassette inlet 11.

When the cassette 7 is removed after the completion of unloading as seen in FIG. 1, the front door 6 is held open until a predetermined time interval elapses as will be described later. If another cassette 7 is not placed in during this time interval, the loading motor is started up again to rotate the first levers 2 counter-clockwise.

This brings the protuberant face 24 of the cam 23 on the first lever 2 out of engagement with the first contact portion 31 of the second lever 3, permitting clockwise rotation of the second lever 3 and causing the first spring 63 to close the front door 6.

The closing of the front door 6 exerts a clockwise torque on the auxiliary lever 5 in engagement with the drive pin 65 of the door 6 to move the lever 4 clockwise along with the second lever 3. The second contact portion 32 of the second lever 3 thereafter comes into engagement with the engaging portion 26 of the cam 23 on the first lever 2 as seen in FIG. 2, preventing counterclockwise rotation of the first lever 2 and overloading the loading motor, whereby the loading motor is stopped. The apparatus is therefore set in the waiting mode shown in FIG. 2.

If another cassette 7 is placed in while the front door 6 is held open in FIG. 1, the cassette 7 is transported to the loading completed position as already described.

In the case where current is supplied to the VTR and in the case where no current is supplied thereto, the door mechanism operates as follows when the front door 6 is manually closed.

With Supply of Current

When the door 6 is pushed by hand and thereby rotated in the closing direction, i.e. counterclockwise from the open position of FIG. 1, the pressing portions 66 of the door 6 push the short pins 51 of the cassette holder 5 closer to the door 6 to retract the cassette 7. This retracts the link plates 27, opening the loading start switch 81 to start the usual loading operation. The cassette holder 5, the first lever 2, the second lever 3 and the auxiliary lever 4 thereafter stop in the position of waiting mode shown in FIG. 2.

With No Supply of Current

When the door 6 is rotated in the closing direction from the open position in FIG. 1 by pushing with one's hand, the drive pin 65 on the door 6 exerts a clockwise force on the auxiliary lever 4 and the second lever 3.

Figure 4:
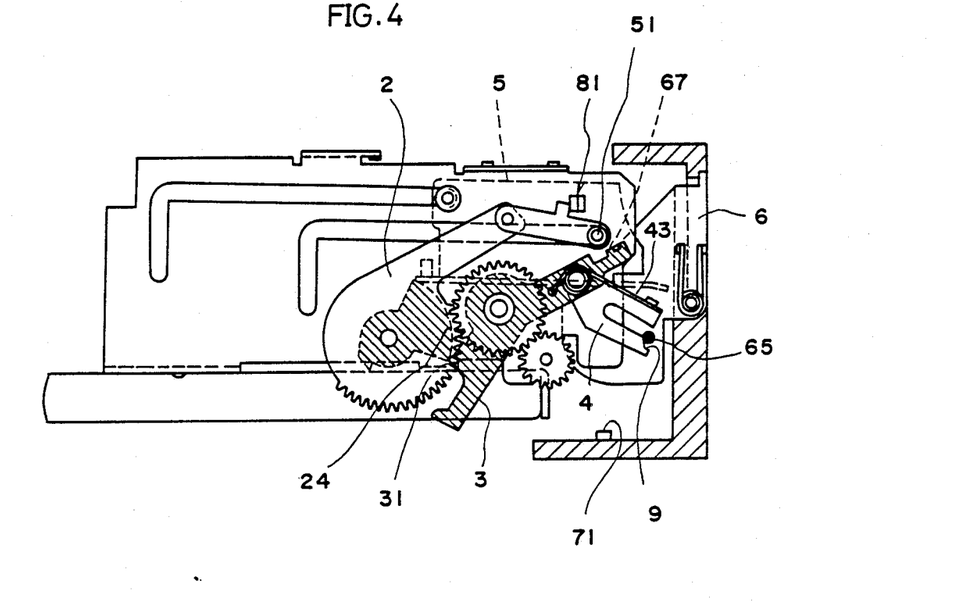
FIG. 4 is a side elevation showing the door mechanism when the front door is closed manually while there is no current supplied.

The second lever 3 is restrained from rotating clockwise by bearing contact with the pressing protuberant face 24 of the cam 23 on the first lever 2, while the auxiliary lever 4 on the second lever 3 is merely biased counterclockwise by the second spring 43 and is free to rotate clockwise relative to the second lever 3, with the result that the auxiliary lever 4 alone rotates clockwise on the second lever 3 as seen in FIG. 4.

Accordingly, no objectionable force acts on the second lever 3, rendering the door 6 closable and free of trouble.

With the door 6 closed, the opening-closing drive pin 65 of the door 6 is in engagement with the lock portion 9 formed on the auxiliary lever 4, permitting the closed door 6 and the auxiliary lever 4 to bear against each other, whereby the door 6 is held closed.

As in the case where current is supplied to the apparatus, the pressing portions 66 press the short pins 51 with the rotation of the door 6 to slightly move the link plate 27 and thereby temporarily open the loading start switch 81, but the short pins 51 are released from the pressing portions 66 upon the closing of the door 6, returning the switch 81 to the original closed state.

When the loading instruction switch is depressed after the door 6 has been manually closed as seen in FIG. 4, the loading motor is started up, rotating the first lever 2 counterclockwise. The second lever 3 rotates clockwise following this movement, whereby the drive pin 65 of the door 6 is released from the lock portion 9 of auxiliary lever 4 to fit into the guide groove 41. The door 6 is therefore unlocked.

The first lever 2, the second lever 3 and the auxiliary lever 4 thereafter stop in the position of waiting mode shown in FIG. 2.

The foregoing mode control sequence is realized according to a computer program set for the system controller 94 shown in FIG. 9. The operation of the circuit of FIG. 9 will be described below with reference to the flow chart of FIG. 10.

Operation of Circuit

Figure 10:
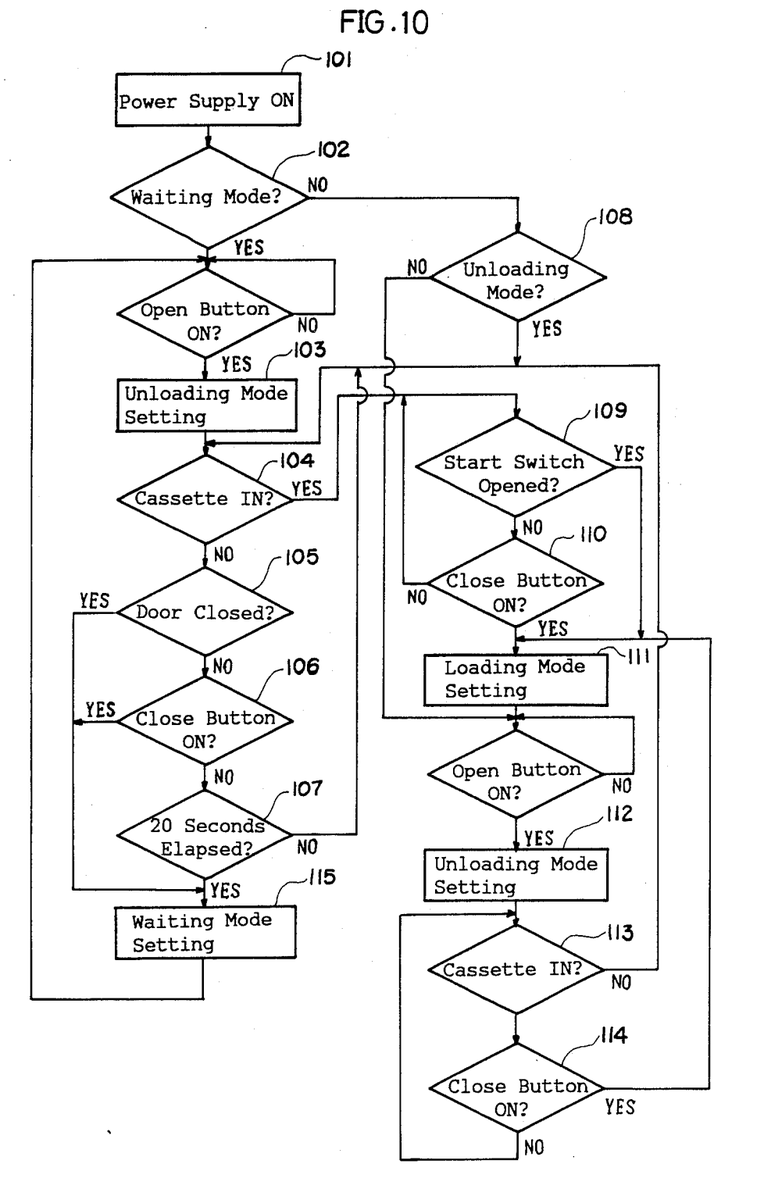
FIG. 10 is a flow chart showing the operation of the mode control circuit.

The power supply for the VTR is closed in step 101, whereupon the system controller 94 is reset by the reset means 93, and thereafter identifies the current mode with reference to an output from the mode sensor means 90 in step 102.

When the current mode is found to be the waiting mode (FIG. 2), the open switch OP is checked as to whether it is closed by depressing the open button. The loading motor is thereafter started up in a direction opposite to the loading direction. When an overload is subsequently detected by the load sensor means 91, the loading motor is stopped. Consequently, the front door is opened, and the apparatus is set in the unloading mode (FIG. 1) ready for the insertion of a cassette (step 103).

If the current mode is not found to be the waiting mode in step 102, step 108 inquires whether the apparatus is in the unloading mode.

After the unloading mode is set in step 103, or when the unloading mode is identified in step 108, the sequence proceeds to step 104 to check whether a cassette is present based on an output from the sensor 71, to step 105 to check whether the loading start switch 81 is opened by the closing of the door, to step 106 to inquire whether the close switch CL is actuated by the close button and then to step 107 to inquire whether the time interval of 20 seconds has been measured by the timer means 95.

When the close button has been depressed, when the door has been closed or when the door has been left open for 20 seconds, the loading motor 92 is driven in the loading direction. This rotation continues until an overload is detected by the load sensor means 91. Upon the detection of an overload, the waiting mode shown in FIG. 2 is set in step 115.

When the cassette is found inserted by step 104, step 109 inquires whether the loading start switch 81 is opened by the advance of the cassette, or step 110 checks whether the close button is on. If the start switch 81 is open or if the close button is on, the loading motor 92 is started up in the loading direction.

Consequently, the cassette holder 5 moves along with the cassette 7 to the loading completed position. Upon the holder 5 reaching this position, the load sensor means 91 detects an overload on the loading motor 92, whereupon the motor 92 is stopped. As a result, the VTR is set in the loading mode of FIG. 3 in step 111.

After the loading mode is set in step 111, or after the loading mode is identified in step 108, this mode is maintained until the open button is depressed.

When the open button is thereafter depressed, the loading motor 92 is driven in the direction opposite to the loading direction. The motor 92 is stopped upon the load sensor means 91 detecting an overload. In this state, the apparatus is set in the unloading mode (FIG. 1) with the cassette 7 projected from the cassette inlet (step 112).

The sequence then proceeds to step 113 to inquire whether the cassette has been removed, and to step 114 to inquire whether the close button is on. If the closed button is manipulated with the cassette loaded, the apparatus is set in the loading mode again in step 111. The removal of the cassette is followed by the foregoing steps 105, 106 and 107. The VTR is then set in the waiting mode of FIG. 2.

According to the embodiment described above, the cassette holder 5 is mechanically restrained in position in the different modes to detect the resulting overload on the loading motor and set the subsequent mode. However, this method is not limitative; the rotated position of the first lever 2 can be detected by the mode sensor means 90 and utilized for the same purpose.

The lock portion 9 for locking the door 6 in its closed position need not always be formed on the auxiliary lever 4 as described above. For example, the front short pin 51 on the cassette holder 5 may be made engageable with a cutout portion 67 of the end plate 60 of the door 5 for locking the door 6.

The components of the apparatus of the invention are not limited in construction to those of the above embodiment but can be modified variously by one skilled in the art without departing from the scope of the invention as defined in the appended claims.

What is claimed is:

1. In a signal recording-reproducing apparatus adapted for use with a cassette and having a cassette loading mechanism for transporting the cassette to a recording-reproducing position when the cassette is inserted into a cassette inlet, a front door mechanism comprising:
   (a) a front door disposed at the cassette inlet and rotatable about the lower side of the inlet to open outwardly of the apparatus;
   (b) first spring means biasing the front door in its closing direction;
   (c) a lever assembly movable in operative relation with the cassette loading mechanism;
   (d) an auxiliary lever pivotally and movably supported on the lever assembly, and having a pivotally movable end engageable with the front door, the auxiliary lever being movable from the position of a first rotated angle where the front door is fully opened to the position of a second rotated angle where the front door is fully closed when the lever assembly is in in a position for loading; and
   (e) second spring means biasing the auxiliary lever from the position of the second angle toward the position of the first angle and biasing the door in its opening direction with a force greater than the force of the first spring means biasing the door in its closing direction.

2. A front door mechanism as defined in claim 1 which further comprises lock means for locking the front door in its closed position, the lock means being provided with an engaging portion engageable with the front door by closing the door when the lever assembly is in the operative state to start loading, the engaging portion being disengageable from the door by the loading movement of the cassette loading mechanism.

3. A front door mechanism as defined in claim 1 wherein the lever assembly comprises a first lever for driving a cassette holder and a second lever movable in engagement with a cam formed on the first lever, the cam having a pressing protuberant face for driving the second lever in the door opening direction when the first lever is rotated in a direction opposite to the loading direction.

4. A front door mechanism as defined in claim 1 wherein the front door is rotatable through approximately 90 degrees from a cassette inlet closing position to an opened position where the door is flush with the bottom plate of a cassette holder positioned for the start of loading.

5. In a signal recording-reproducing apparatus adapted for use with a cassette and having a cassette loading mechanism for transporting the cassette to a recording-reproducing position when the cassette is inserted into a cassette inlet, a front door mechanism comprising:
   (a) a front door disposed at the cassette inlet rotatable about the lower side of the inlet and openable outwardly of the apparatus;
   (b) a door opening-closing assembly provided between the cassette loading mechanism and the front door for fully opening the front door when the cassette is to be loaded into the apparatus and closing the front door with the progress of the loading operation;
   (c) cassette sensor means for detecting whether the cassette is loaded on the loading mechanism as positioned for the start of loading;
   (d) door closure sensor means for detecting that the front door is closed;
   (e) timer means for measuring the duration of the unloaded state of the apparatus with the door held open based on the outputs of the cassette sensor means and the door closure sensor means, and for detecting the time and producing a detection signal when the duration exceeds a predetermined time interval; and (f) control means for initiating the cassette loading mechanism into movement in the loading direction based on the detection signal from the timer means and stopping the loading mechanism during loading with the front door closed.

6. A front door mechanism as defined in claim 5 wherein the door opening-closing assembly comprises:

(a) first spring means biasing the front door in its closing direction, (b) a drive lever assembly movable in operative relation with the cassette loading mechanism, (c) an auxiliary lever pivotally movably supported on the drive lever assembly and having a pivotally movable end engageable with the front door, the auxiliary lever being movable from the position of a first rotated angle where the front door is fully opened to the position of a second rotated angle where the front door is fully closed when the drive lever assembly is in an operative state to start loading, and (d) second spring means biasing the auxiliary lever from the position of the second angle toward the position of the first angle and biasing the door in its opening direction with a force greater than the force of the first spring means biasing the door in its closing direction.

* * * * *